United States Patent
Ohseki et al.

(10) Patent No.: US 8,243,652 B2
(45) Date of Patent: Aug. 14, 2012

(54) RADIO FRAME CONTROL APPARATUS, RADIO FRAME CONTROL METHOD, AND RADIO COMMUNICATION APPARATUS

(75) Inventors: Takeo Ohseki, Fujimino (JP); Takashi Inoue, Fujimino (JP)

(73) Assignee: KDDI Corporation, Tokyo (JP)

( * ) Notice: Subject to any disclaimer, the term of this patent is extended or adjusted under 35 U.S.C. 154(b) by 1174 days.

(21) Appl. No.: 12/079,896

(22) Filed: Mar. 28, 2008

(65) Prior Publication Data

US 2008/0259860 A1    Oct. 23, 2008

(30) Foreign Application Priority Data

Mar. 30, 2007  (JP) ............................... P2007-093760

(51) Int. Cl.
*H04B 7/212* (2006.01)

(52) U.S. Cl. ........ 370/321; 370/352; 370/328; 370/329; 370/319; 370/344; 455/439; 455/442; 455/443; 455/445; 455/450

(58) Field of Classification Search .................. 370/352, 370/356, 319, 328, 329, 344; 455/439, 442, 455/443, 445, 450, 451, 452.1, 452.2, 455, 455/464, 509
See application file for complete search history.

(56) References Cited

U.S. PATENT DOCUMENTS

| | | | |
|---|---|---|---|
| 2004/0142729 A1* | 7/2004 | Yuda et al. | 455/562.1 |
| 2006/0009224 A1* | 1/2006 | Lim et al. | 455/442 |
| 2007/0026896 A1* | 2/2007 | Han et al. | 455/561 |
| 2007/0032255 A1* | 2/2007 | Koo et al. | 455/512 |
| 2007/0060178 A1* | 3/2007 | Gorokhov et al. | 455/506 |
| 2007/0140167 A1* | 6/2007 | Jang et al. | 370/329 |
| 2008/0031190 A1* | 2/2008 | Bae et al. | 370/329 |

FOREIGN PATENT DOCUMENTS

| | | |
|---|---|---|
| WO | WO 2007/015829 A2 | 2/2007 |
| WO | WO 2007/015830 A2 | 2/2007 |

OTHER PUBLICATIONS

"A Downlink Data Region Allocation Algorithm for IEEE 802.16e OFDMA" IEEE 1-4244-0983-7/07, 2007.*
IEEE Std 802. 16-2004, "Air Interface for Fixed Broadband Wireless Access Systems", 2004.
IEEE Std 802. 16e-2005, "Air Interface for Fixed Broadband Wireless Access Systems", 2005.
Japanese Office Action mailed May 17, 2011 for Japanese Patent Application No. 2007-093760.
Yigal Leiba et al., "Mini-subchannel support for OFDMA PHY mode", IEEE C802.16d-04/69, IEEE 802.16 Broadband Wireless Access Working Group, Apr. 15, 2004.

* cited by examiner

*Primary Examiner* — Joe H Cheng
*Assistant Examiner* — Khaled Kassim
(74) *Attorney, Agent, or Firm* — Morgan, Lewis & Bockius LLP

(57) ABSTRACT

A radio frame control apparatus for controlling a radio frame of an orthogonal frequency division multiple access system, having a placement information generation section generating first placement information including a radio resource amount assigned to each terminal station based on a received radio resource request, a pseudo placement information generation section generating pseudo placement information including a temporal radio resource amount assigned to pseudo communication, a radio resource assignment section generating second placement information by inserting the pseudo placement information into the first placement information.

3 Claims, 6 Drawing Sheets

FIG. 3

PLACEMENT INFO

| COMMUNICATION ID | PHY_MODE | RESOURCE AMOUNT[slot] |
|---|---|---|
| 99 (PSEUDO COMMUNICATION) | A | 8 |

Prior Art

RADIO FRAME CONTROL APPARATUS, RADIO FRAME CONTROL METHOD, AND RADIO COMMUNICATION APPARATUS

BACKGROUND OF THE INVENTION

1. Field of the Invention

The present invention relates to a radio frame control apparatus, a radio frame control method, and a radio communication apparatus.

Priority is claimed on Japanese Patent Application No. 2007-093760, filed Mar. 30, 2007, the content of which is incorporated herein by reference.

2. Description of Related Art

As a next-generation wireless access system, IEEE 802.16 serving as an Institute of Electrical and Electronic Engineers (IEEE) standard for realizing a high-speed broadband transmission (for example, see IEEE Std 802.16-2004, "Air Interface for Fixed Broadband Wireless Access Systems," 2004). In the IEEE 802.16 standard, an Orthogonal Frequency Division Multiple Access (OFDMA) system is adopted as a transmission system. The OFDMA system is a multicarrier transmission system for performing communication using a broadband signal configured from a plurality of subcarriers whose frequencies are orthogonal to each other, and realizes multiple accesses between one base station and multiple users by using different subcarriers between users (terminal stations). As an extension of the IEEE 802.16 standard, an IEEE 802.16e standard for a mobile communication environment is defined (for example, see IEEE Std 802.16e-2005, "Air Interface for Fixed Broadband Wireless Access Systems," 2005.). Similarly, also in the IEEE 802.16e standard, the OFDMA system is adopted as a transmission system.

FIG. 5 shows a conventional configuration example of a radio frame of an uplink (link from a terminal station to a base station) (hereinafter, referred to as "uplink subframe"). The uplink subframe of FIG. 5 is based on the IEEE 802.16 and IEEE 802.16e standards (hereinafter, both the standards are referred to as the IEEE 802.16 standard or the like).

In FIG. 5, the uplink subframe is configured from a plurality of OFDMA symbols and a plurality of logical subchannels. In the uplink subframe, the plurality of OFDMA symbols are multiplexed in a time axis direction over an uplink subframe duration. Moreover, in an OFDMA symbol, a plurality of subchannels are frequency multiplexed.

In the OFDMA system, placement information indicating whether to arrange a packet from each user in a logical subchannel of an OFDMA symbol is determined on an uplink subframe basis. The base station notifies each terminal station of the determined placement information through downlink communication. A transmitter of each terminal station performs an uplink packet transmission using a logical subchannel designated in the notified placement information.

An uplink packet from each terminal station arranged in the logical subchannel is transmitted after being rearranged in a frequency axis direction upon actual transmission. In the IEEE 802.16e standard, a rearrangement pattern is designated with a parameter called uplink permbase (UL_Permbase). UL_Permbase is defined by designating values from 0 to 69, and the rearrangement pattern differs according to the values. Each terminal station converts data displaced in a logical subchannel in a pattern based on the UL_Permbase value into an arrangement on an actual frequency and then performs a transmission.

FIG. 5 shows a Partial Usage of SubChannels (PUSC) zone of an uplink subframe of the IEEE 802.16 standard or the like. As shown in the same figure, a ranging subchannel and an uplink burst (UL burst) are placed in the uplink subframe. The ranging subchannel is a part for storing a signal for transmitting an access request when a terminal station accesses a base station or transmitting a band request after access. The UL burst is a part for storing a packet of actual communication and one UL Burst is configured with an uplink packet from one terminal station. For the UL burst, its size can be arbitrarily determined within a limit defined in the IEEE 802.16 or the like. In FIG. 5, five UL bursts for the uplink are arranged. The arrangement method is based on the IEEE 802.16 standard or the like.

FIG. 6 shows an example of a relationship between placement information reported to a terminal station side and an uplink burst on a radio frame in the related art. As shown in FIG. 6, the placement information is configured with three information elements of a communication identifier, a modulation scheme and coding rate (PHY_MODE), and a resource amount, available in a packet transmission, assigned to corresponding communications, and a resource amount for one communication identifier within the placement information corresponds to a definition of one uplink burst on a radio frame.

However, the IEEE 802.16 standard or the like defines a method for assigning OFDMA symbols and subcarriers, that is, an uplink burst arrangement method. According to the definition, one burst secures a resource in ascending order of logical subchannel numbers as in a burst configuration shown in UL Burst #2 of FIG. 5. In one logical subchannel, a resource is secured in a time axis direction (OFDMA symbol direction). A resource is secured subsequent to the end of a previous burst, such that a packet is to be assigned in the resource.

That is, a resource used for each communication indicated by a communication identifier within the placement information is to be secured from a resource immediately after a resource used by the previous communication according to a sequence indicated in the placement information. A resource amount used by each communication corresponds to a resource amount designated in the placement information. The position and size of each uplink burst are determined by two information elements.

For example, since the communication of a communication identifier 1 is assigned 11 slots as an available resource amount in FIG. 6, a packet is transmitted using slots from a first slot of the No. 2 logical subchannel serving as the next channel of the No. 1 logical subchannel secured by a ranging subchannel to the third slot of the No. 4 logical subchannel. Since the communication of a communication identifier 2 is assigned 14 slots as an available resource amount, a packet is transmitted using slots from the fourth slot of the No. 4 logical subchannel immediately after a resource used by the communication of the communication identifier 1 to the first slot of the No. 8 logical subchannel. Since the communication of a communication identifier 3 is assigned 19 slots as an available resource amount, a packet is transmitted using slots from a second slot of the No. 8 logical subchannel immediately after a resource used by the communication of the communication identifier 2 to the last slot of the No. 12 logical subchannel. Since the communication of a communication identifier 4 is assigned 14 slots as an available resource amount, a packet is transmitted using slots from the first slot of the No. 13 logical subchannel immediately after a resource used by the communication of the communication identifier 3 to a second slot of the No. 16 logical subchannel. Since the communication of a communication identifier 5 is assigned 14 slots as an available resource amount, a packet is transmitted using slots from the third slot of the No. 16 logical subchannel immediately after a resource used by the communication of the communication identifier 4 to the last slot of the No. 19 logical subchannel.

For this reason, there is a problem in that a radio frame, in which an empty slot and an empty logical subchannel are present before an uplink burst, may not be conventionally configured. Also in the case when there is a logical subchannel of a bad radio wave environment or an unused logical subchannel, there is a problem in that a radio frame, in which an empty slot and an empty logical subchannel are present, may not be configured.

SUMMARY OF THE INVENTION

The present invention has been made to address the above-mentioned problems, and an object of the present invention is to provide a radio frame control apparatus, a radio frame control method, and a radio communication apparatus that can configure a radio frame in which an empty slot and an empty logical subchannel are present before an uplink burst on the basis of a standard such as the IEEE 802.16 standard or the like in an uplink PUSC zone of an OFDMA system, and that can configure a radio frame in which an empty slot and an empty logical subchannel are present even when there is a logical subchannel of a bad radio wave environment or an unused logical subchannel.

A first aspect of the present invention is a radio frame control apparatus for controlling a radio frame of an OFDMA system, having a placement information generation section, a pseudo placement information generation section, and a radio resource assignment section. The placement information generation section generates first placement information including a radio resource amount assigned to each terminal station based on a received radio resource request. The pseudo placement information generation section generates pseudo placement information including a temporal radio resource amount assigned to pseudo communication. The radio resource assignment section generates second placement information by inserting the pseudo placement information into the first placement information The first aspect of the present invention can configure a radio frame in which an empty region is created in a logical subchannel on the basis of a standard such as the IEEE 802.16 standard or the like in an uplink PUSC zone of the OFDMA system.

The second aspect of the present invention is a radio communication apparatus of an OFDMA system including: the radio frame control apparatus.

The third aspect of the present invention is a radio frame control method in a radio frame control apparatus for controlling a radio frame of an OFDMA system, including: a placement information generation step of generating first placement information including a radio resource amount assigned to each terminal station on a basis of a received radio resource request; a pseudo placement information generation step of generating pseudo placement information including a temporal radio resource amount assigned to pseudo communication; and a radio resource assignment step of generating second placement information by inserting the pseudo placement information into the first placement information.

The present invention can configure a radio frame in which an empty slot and an empty logical subchannel are present before an uplink burst on the basis of a standard such as the IEEE 802.16 standard or the like in an uplink PUSC zone of an OFDMA system, and can configure a radio frame in which an empty slot and an empty logical subchannel are present even when there is a logical subchannel of a bad radio wave environment or an unused logical subchannel.

BRIEF DESCRIPTION OF THE DRAWINGS

FIG. 3 is an example of pseudo placement information generated by a pseudo placement information generation section according to an embodiment of the present invention.

DETAILED DESCRIPTION OF THE INVENTION

Figure 1:
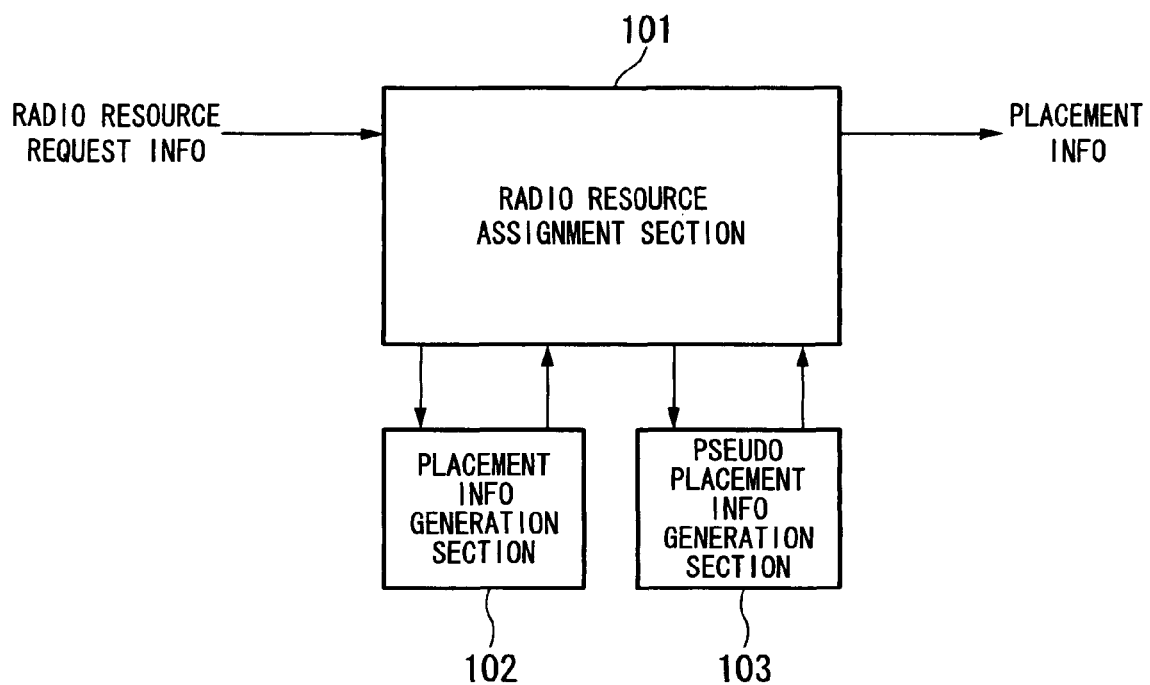
FIG. 1 is a block diagram showing a configuration example of a radio frame control apparatus according to an embodiment of the present invention.

Hereinafter, embodiments of the present invention will be described with reference to the drawings. FIG. 1 is a block diagram showing a configuration example of a radio frame control apparatus according to an embodiment of the present invention. The radio frame control apparatus of this embodiment controls a radio frame of an OFDMA system, and, for example, is provided in a radio communication apparatus (base station apparatus or the like) of the OFDMA system. In this embodiment, the case where the radio frame control apparatus of FIG. 1 controls a radio frame of uplink (link from a terminal station to a base station) (an uplink subframe) of the OFDMA system based on an IEEE 802.16 standard or the like will be described.

In FIG. 1, the radio frame control apparatus has a radio resource assignment section 101, a placement information generation section 102, and a pseudo placement information generation section 103. The radio resource assignment section 101 receives radio resource request information from a terminal station. The radio resource request information is a request message for a resource to be used for communication in an uplink serving as a link from the terminal station to a base station.

The radio resource assignment section 101 outputs a request message for creating placement information on a radio frame to the placement information generation section 102 and the pseudo placement information generation section 103 on the basis of the resource request information received from the terminal station. The placement information generated from the placement information generation section 102 and the pseudo placement information generation section 103 is received, an arrangement of the placement information is adjusted, and the last placement information to be reported to a terminal station is created and output. The placement information generation section 102 creates placement information on a radio frame for communication accommodated by a corresponding base station. The pseudo placement information generation section 103 creates placement information on a radio frame for pseudo communication rather than communication to be accommodated by a corresponding base station.

First, the radio resource assignment section 101 receives and stores radio resource request information from each terminal station. Subsequently, the ratio resource assignment section 101 determines a terminal station-specific communication identifier for each terminal station, a modulation scheme and coding rate (PHY_MODE), and a resource amount to be assigned to the terminal station on the basis of the stored radio resource request information. For example, a pair of modulation scheme and coding rate to be used for communication with the terminal station in which a communication identifier 1 is assigned is A and the assigned radio resource amount is 11 slots. A pair of modulation scheme and coding rate to be used for communication with the terminal station to which a communication identifier 2 is assigned is B and the assigned radio resource amount is 14 slots. A pair of modulation scheme and coding rate to be used for communication with the terminal station to which a communication identifier 3 is assigned is C and the assigned radio resource amount is 19 slots. A pair of modulation scheme and coding rate to be used for communication with the terminal station to which a communication identifier 4 is assigned is D and the assigned radio resource amount is 14 slots.

Subsequently, the radio resource assignment section 101 transmits a communication identifier assigned to each terminal station, a modulation scheme and coding rate, and an assigned radio resource amount to the placement information generation section 102. Subsequently, the placement information generation section 102 generates placement information (first placement information) on the basis of the communication identifier assigned to each terminal station, the modulation scheme and coding rate, and the assigned radio resource amount received from the radio resource assignment section 101. The placement information is information for determining the placement of each resource on a radio frame. The first placement information and the placement of each resource on the frame will be described with reference to FIG. 2.

Figure 2:
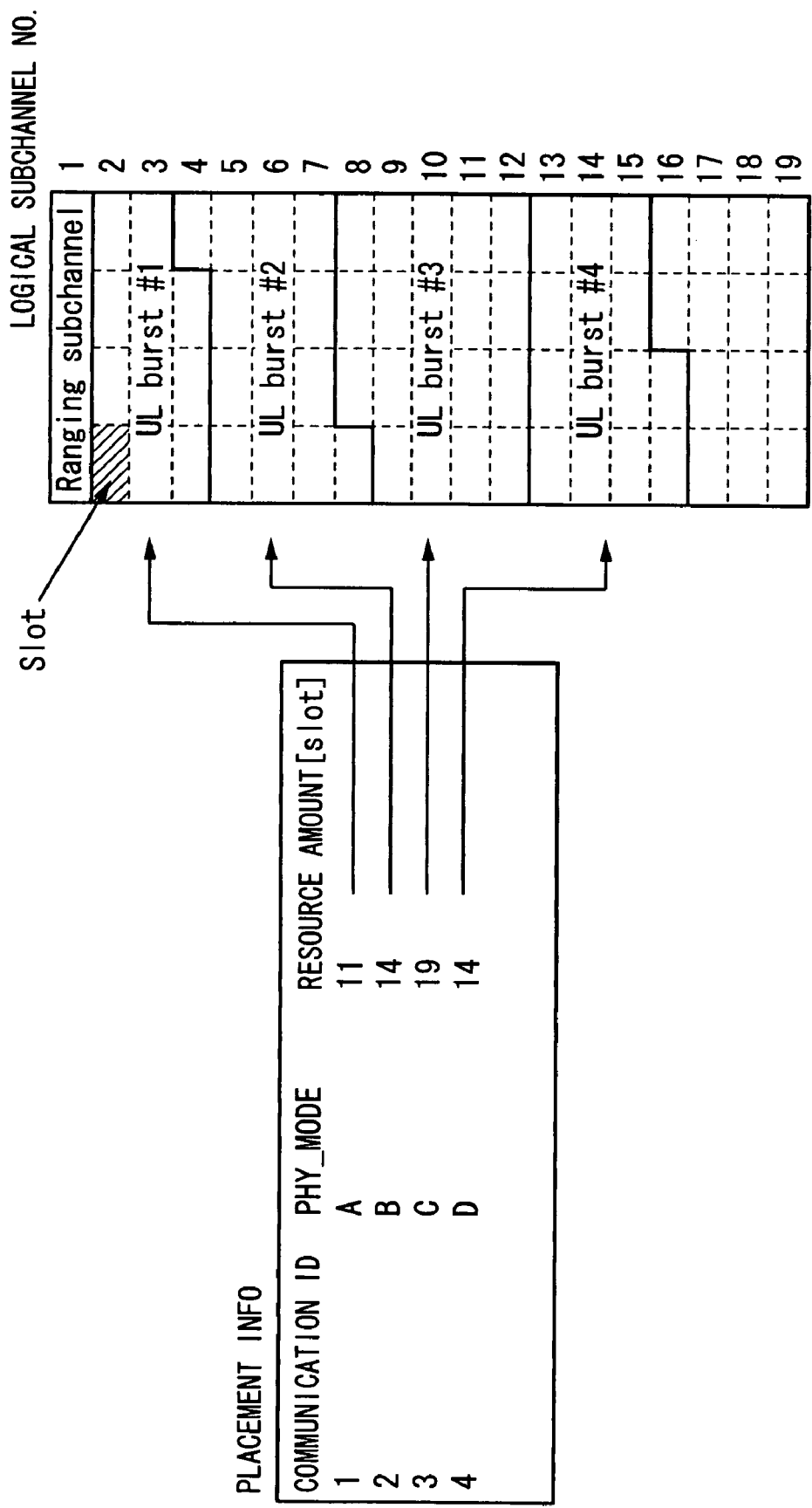
FIG. 2 shows a relationship between placement information generated by a placement information generation section and a radio frame configuration according to an embodiment of the present invention.

FIG. 2 shows a relationship between placement information generated by the placement information generation section 102 and a radio frame configuration in this embodiment. The placement information is shown in the form of a table, and its attributes are a communication identifier, PHY_MODE, and a resource amount. A unit of a resource amount is a slot. One row indicates information with respect to one terminal station. In the four rows of the example shown, PHY_MODE of a terminal station to which a communication identifier 1 is assigned is A and the resource amount is 11 slots. PHY_MODE of a terminal station to which a communication identifier 2 is assigned is B and the resource amount is 14 slots. PHY_MODE of a terminal station to which a communication identifier 3 is assigned is C and the resource amount is 19 slots. PHY_MODE of a terminal station to which a communication identifier 4 is assigned is D and the resource amount is 14 slots.

UL Burst #1 used in a terminal station of the communication identifier 1 is assigned slots from the first slot of the No. 2 logical subchannel to the third slot of the No. 4 logical subchannel. UL Burst #2 used in a terminal station of the communication identifier 2 is assigned slots from the fourth slot of the No. 4 logical subchannel to the first slot of the No. 8 logical subchannel. UL Burst #3 used in a terminal station of the communication identifier 3 is assigned slots from a second slot of the No. 8 logical subchannel to the last slot of the No. 12 logical subchannel. UL Burst #4 used in a terminal station of the communication identifier 4 is assigned slots from the first slot of the No. 13 logical subchannel to the second slot of the No. 16 logical subchannel.

Subsequently, the placement information generation section 102 transmits the generated placement information to the radio resource assignment section 101.

Subsequently, the radio resource assignment section 101 receives information of the logical subchannels of a bad communication state from a monitoring section (not shown) for monitoring communication between a corresponding base station and each terminal station. For example, the logical subchannels of the bad communication are the No. 13 logical subchannel and the No. 14 logical subchannel.

Subsequently, the radio resource assignment section 101 determines a temporal communication identifier, a temporal modulation scheme and coding rate, and a temporal radio resource amount for assigning a logical subchannel whose communication state is bad for pseudo radio communication.

Subsequently, the radio resource assignment section 101 identifies an uplink burst to which a logical subchannel of a bad communication state is assigned on the basis of the placement information generated by the placement information generation section 102. An uplink burst to which the No. 13 logical subchannel and the No. 14 logical subchannel of the bad communication state are assigned is UL Burst #4.

Subsequently, the radio resource assignment section 101 computes a temporal radio resource amount to be assigned to pseudo radio communication. Eight slots corresponding to slots from the first slot of Uplink Burst #4 to which the No. 13 logical subchannel and the No. 14 logical subchannel are assigned to the last slot of the No. 14 logical subchannel are the temporal resource amount.

Subsequently, the temporal communication identifier, the temporal modulation scheme, and coding rate assigned to the pseudo radio communication are determined. The temporal communication identifier is 99, the temporal modulation scheme and coding rate are A.

Subsequently, the radio resource assignment section 101 transmits the temporal communication identifier, the temporal modulation scheme and coding rate, and the temporal radio resource amount assigned to the pseudo radio communication to the pseudo placement information generation section 103.

Subsequently, the pseudo placement information generation section 103 generates pseudo placement information on the basis of the temporal communication identifier, the temporal modulation scheme and coding rate, and the temporal radio resource amount assigned to the pseudo radio communication received from the radio resource assignment section 101. The pseudo placement information is information indicating the temporal radio resource amount assigned to the pseudo radio communication.

FIG. 3 shows pseudo placement information generated by the pseudo placement information generation section 103 in this embodiment. The placement information is shown in the form of a table, and its attributes are a communication identifier, PHY_MODE, and a resource amount. The unit of a resource amount is a slot. One row indicates information with respect to one terminal station. In one row in a shown example, PHY_MODE of the terminal station to which a communication identifier (temporal communication identifier) 99 is assigned is A and the resource amount (temporal resource amount) is 11 slots.

Subsequently, the pseudo placement information generation section 103 transmits the generated pseudo placement information to the radio resource assignment section 101.

Next, the radio resource assignment section 101 inserts the pseudo placement information before a communication identifier of a terminal station using a logical subchannel of a bad communication state in placement information of the placement information generation section 102 to generate placement information (second placement information). The radio resource assignment section 101 configures a radio frame from the second placement information.

For example, the radio resource assignment section 101 inserts the pseudo placement information of the terminal station using the logical subchannel of the bad communication state, that is, before the communication identifier 4, in the placement information generated by the placement information generation section 102. The placement information generated by the radio resource assignment section 101 will be described with reference to FIG. 4.

Figure 4:
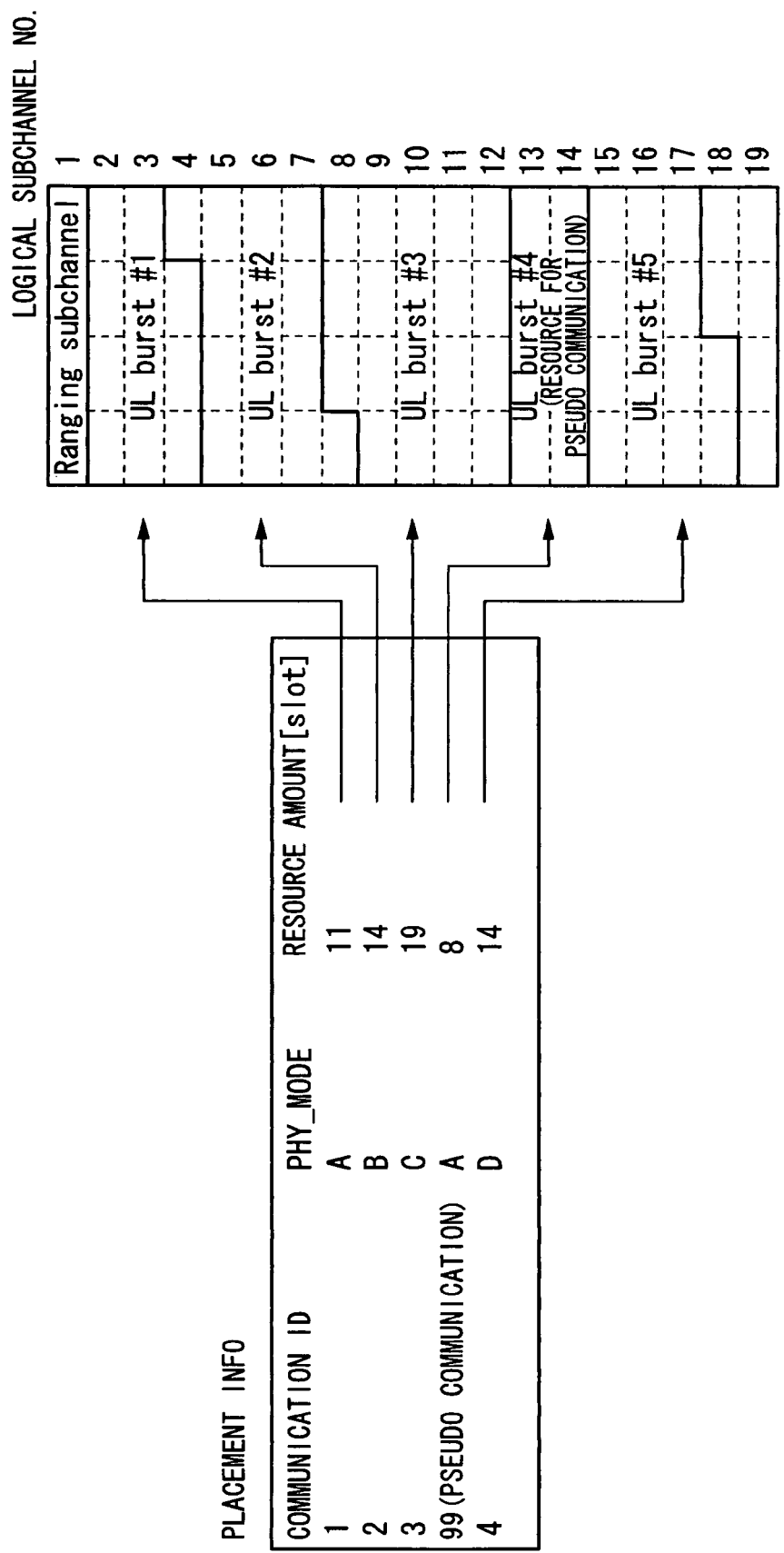
FIG. 4 shows the relationship between placement information generated by a radio resource assignment section and a radio frame configuration according to an embodiment of the present invention.
Figure 5:
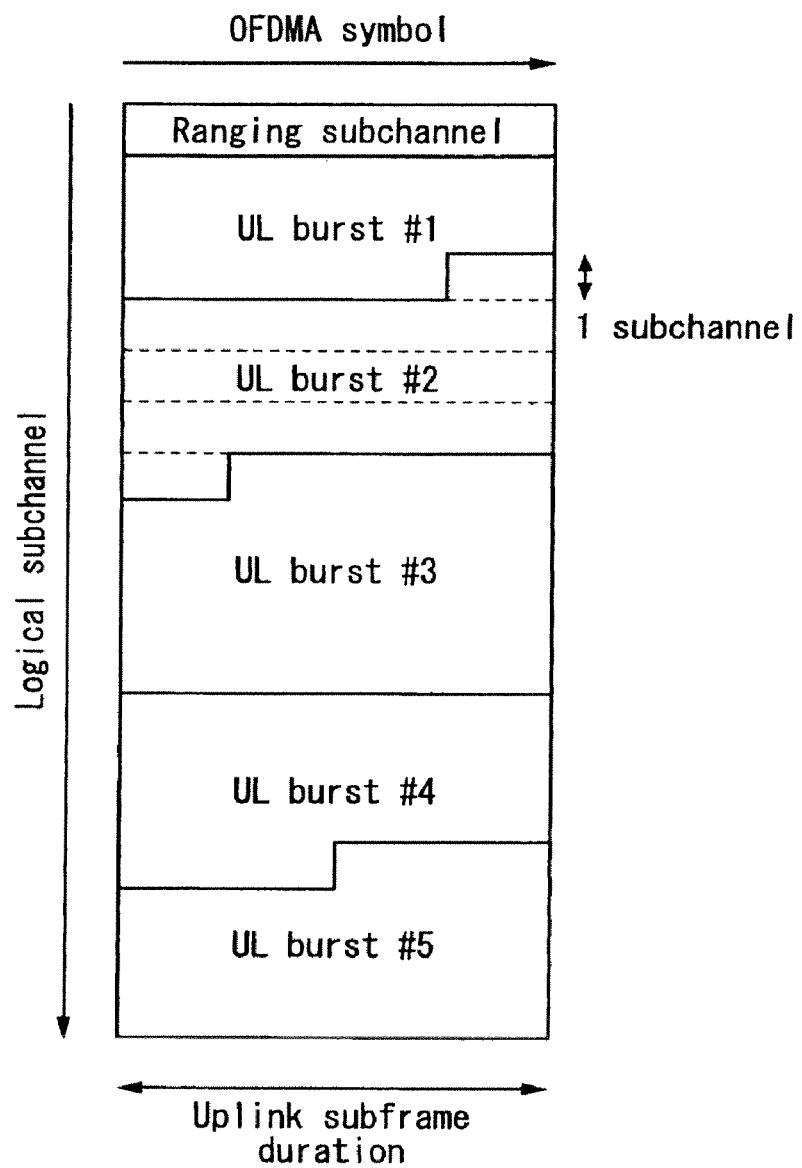
FIG. 5 shows a configuration example of an uplink subframe of an OFDMA system.
Figure 6:
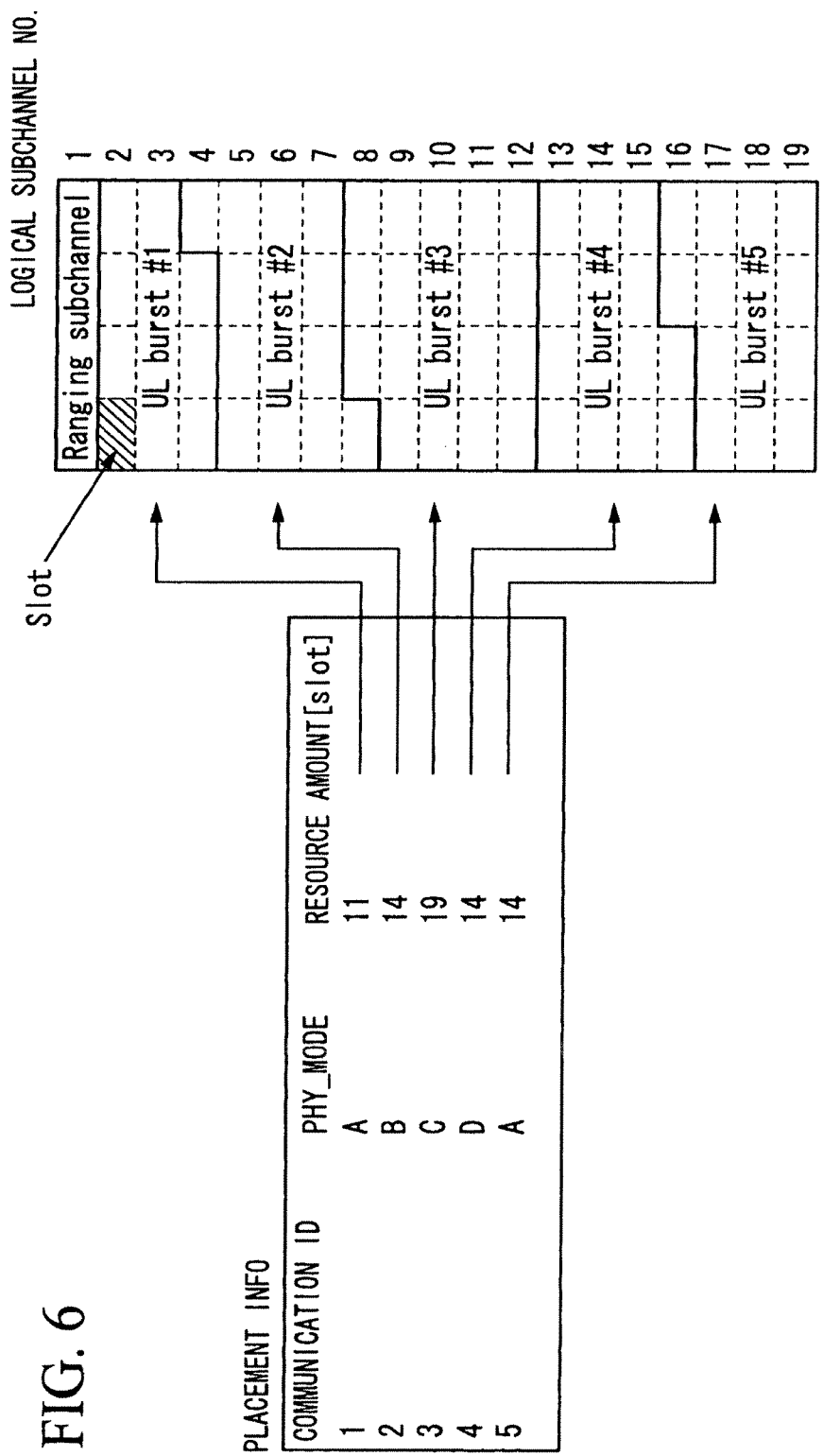
FIG. 6 shows a relation of placement information reported to a terminal station side by a conventional radio frame control apparatus and a radio frame configuration.

FIG. 4 shows a relationship between placement information generated by the radio resource assignment section 101 and a radio frame configuration according to an embodiment of the present invention. The placement information is shown in the form of a table, and its attributes are a communication identifier, PHY_MODE, and a resource amount. The unit of a resource amount is a slot. One row indicates information of one terminal station. In the five rows of the example shown, PHY_MODE of a terminal station to which a communication identifier 1 is assigned is A and the resource amount is 11 slots. PHY_MODE of a terminal station to which a communication identifier 2 is assigned is B and the resource amount is 14 slots. PHY_MODE of a terminal station to which a communication identifier 3 is assigned is C and the resource amount is 19 slots. PHY_MODE of a terminal station to which a communication identifier 99 is assigned is A and the resource amount is 8 slots. PHY_MODE of a terminal station to which a communication identifier 4 is assigned is D and the resource amount is 14 slots.

UL Burst #1 used in a terminal station of the communication identifier 1 is assigned slots from the first slot of the No. 2 logical subchannel to the third slot of the No. 4 logical subchannel. UL Burst #2 used in a terminal station of the communication identifier 2 is assigned slots from the fourth slot of the No. 4 logical subchannel to the first slot of the No. 8 logical subchannel. UL Burst #3 used in a terminal station of the communication identifier 3 is assigned slots from a second slot of the No. 8 logical subchannel to the last slot of a No. 12 logical subchannel. Since the pseudo placement information is inserted before the communication identifier 4, UL Burst #4 pseudo-used by the terminal station of the communication identifier 99 in the pseudo communication is assigned to the No. 13 logical subchannel and the No. 14 logical subchannel. An uplink burst used in a terminal station of the communication identifier 4 is UL Burst #5 and assigned slots are from the first slot of the No. 15 logical subchannel to the second slot of the No. 18 logical subchannel.

Accordingly, the radio resource assignment section can configure a radio frame without using a logical subchannel of a bad communication state.

As described above, this embodiment can configure a radio frame in which an empty slot and an empty logical subchannel are present before an uplink burst on the basis of a standard such as the IEEE 802.16 standard or the like in an uplink PUSC zone of an OFDMA system and can configure a radio frame in which an empty slot and an empty logical subchannel are present even when there is a logical subchannel of a bad radio wave environment or an unused logical subchannel.

A logical subchannel of a bad radio wave environment has been described in this embodiment, but a radio frame in which a specified empty slot and empty logical subchannel by other factors can be configured. Slots of two logical subchannels are assigned as pseudo placement information in this embodiment, but, of course, it is not necessary that an amount corresponding to an integer multiple of slots of logical subchannels be assigned.

While preferred embodiments of the invention have been described and illustrated above, it should be understood that these are exemplary of the invention and are not to be considered as limiting. Additions, omissions, substitutions, and other modifications can be made without departing from the spirit or scope of the present invention. Accordingly, the invention is not to be considered as being limited by the foregoing description, and is only limited by the scope of the appended claims.

What is claimed is:

1. A radio frame control apparatus comprising:
    a controller which controls an IEEE 802.16 or IEEE 802.16e standards radio frame of an orthogonal frequency division multiple access system;
    a placement information generation section which generates first placement information including a radio resource amount assigned to each terminal station based on a received radio resource request;
    a pseudo placement information generation section which generates pseudo placement information including a temporal radio resource amount assigned to pseudo communication; and
    a radio resource assignment section which generates second placement information by inserting the pseudo placement information into the first placement information.

2. A radio communication apparatus of an orthogonal frequency division multiple access system comprising:
    the radio frame control apparatus according to claim 1.

3. A radio frame control method in a radio frame control apparatus for controlling a radio frame of an orthogonal frequency division multiple access system, comprising:
    a step of controlling the radio frame in accordance with IEEE 802.16 or IEEE 802.16e standards;
    a placement information generation step of generating first placement information including a radio resource amount assigned to each terminal station based on a received radio resource request;
    a pseudo placement information generation step of generating pseudo placement information including a temporal radio resource amount assigned to pseudo communication; and
    a radio resource assignment step of generating second placement information by inserting the pseudo placement information into the first placement information.

* * * * *